(12) United States Patent
Kupiec et al.

(10) Patent No.: US 10,845,270 B2
(45) Date of Patent: Nov. 24, 2020

(54) SYSTEMS AND METHODS FOR DIAGNOSING AN ENGINE

(71) Applicant: Progress Rail Locomotive Inc., LaGrange, IL (US)

(72) Inventors: Gregory R. Kupiec, Lemont, IL (US); Dennis J. Melas, Chicago, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 217 days.

(21) Appl. No.: 15/970,401

(22) Filed: May 3, 2018

(65) Prior Publication Data

US 2019/0339164 A1 Nov. 7, 2019

(51) Int. Cl.
*G01M 15/04* (2006.01)
*F02D 17/02* (2006.01)
*F02D 41/00* (2006.01)

(52) U.S. Cl.
CPC ........... *G01M 15/044* (2013.01); *F02D 17/02* (2013.01); *F02D 41/0087* (2013.01); *G01M 15/046* (2013.01)

(58) Field of Classification Search
CPC .............. G01M 15/044; G01M 15/046; F02D 41/0087; F02D 17/02; F02D 41/22; F02D 2200/101; F02D 41/1497
See application file for complete search history.

(56) References Cited

U.S. PATENT DOCUMENTS

| | | | |
|---|---|---|---|
| 4,502,324 A | 3/1985 | Marino et al. | |
| 5,189,907 A | 3/1993 | Marino et al. | |
| 5,899,189 A | 5/1999 | Kdelsperger et al. | |
| 6,002,980 A | 12/1999 | Taylor et al. | |
| 6,510,731 B2* | 1/2003 | Schricker | G01M 15/044 701/104 |
| 6,535,810 B2* | 3/2003 | Volpe, Jr. | F02B 75/22 701/114 |
| 6,889,133 B2* | 5/2005 | Daniel | F02B 75/22 701/114 |
| 6,923,155 B2* | 8/2005 | Gottemoller | F02D 41/0085 123/198 F |
| 7,246,006 B2* | 7/2007 | Carr | G01M 15/044 701/114 |
| 9,587,567 B2 | 3/2017 | Mahadevan et al. | |
| 10,036,335 B2* | 7/2018 | Banerjee | F02D 41/0097 |
| 2003/0236609 A1* | 12/2003 | Daniel | F02B 75/22 701/102 |
| 2013/0073175 A1* | 3/2013 | Banerjee | F02D 41/1498 701/102 |
| 2014/0163841 A1* | 6/2014 | Sane | F02D 41/0087 701/104 |

* cited by examiner

*Primary Examiner* — Freddie Kirkland, III
(74) *Attorney, Agent, or Firm* — Bookoff McAndrews PLLC

(57) ABSTRACT

A method for diagnosing an engine in a vehicle, the method comprising: initiating a diagnostic test of the engine, disabling a cylinder of the engine, measuring a parameter indicative of performance of the engine, re-enabling the cylinder, comparing the parameter to reference data, assessing a status of the cylinder based on the comparison, and generating a diagnostic result based on the status of the disabled cylinder.

17 Claims, 3 Drawing Sheets

SYSTEMS AND METHODS FOR DIAGNOSING AN ENGINE

TECHNICAL FIELD

The present disclosure relates generally to systems and methods for diagnosing an engine of a vehicle.

BACKGROUND

When an engine is not operating at full power, it can be difficult and time-consuming to determine which component in the engine is at fault. Sometimes, the engine may adjust itself to maintain the full power even if a component fails. In these cases, the failed component may not be diagnosed in a timely manner. Thus, there is a need for methods and systems for prompt and accurate detection of failed components in an engine.

U.S. Pat. No. 6,002,980 ('980 patent) discloses methods and systems for engine cylinder power diagnosis. The methods and systems in the '980 patent measure individual cylinder power contribution by cutting out individual cylinders of a multi-cylinder engine and performing a snap-throttle test on the engine. However, the '980 patent fails to disclose any method or system for real-time diagnosing an engine during normal or intended vehicle operation. The systems and methods of the present disclosure may solve one or more of the problems set forth above and/or other problems in the art. The scope of the current disclosure, however, is defined by the attached claims, and not by the ability to solve any specific problem.

SUMMARY OF THE DISCLOSURE

In one aspect, a method for diagnosing an engine in a vehicle includes initiating a diagnostic test of the engine, disabling a cylinder of the engine, measuring a parameter indicative of performance of the engine, re-enabling the cylinder, comparing the parameter to reference data; assessing a status of the cylinder based on the comparison, and generating a diagnostic result based on the status of the disabled cylinder.

In another aspect, a method for diagnosing an engine in a vehicle includes determining whether conditions of the engine are acceptable to run a diagnostic test, when the conditions of the engine are acceptable to run the diagnostic test, disabling a first cylinder of the engine, maintaining at least 90% of performance of the engine, measuring performance of a second cylinder of the engine, wherein the second cylinder is not disabled, comparing the performance of the second cylinder to reference data, assessing a status of the first cylinder based on the comparison, and generating a diagnostic result based on the status of the first cylinder.

In yet another aspect, a method for diagnosing an engine in a vehicle includes measuring a first parameter indicative of performance of the engine, disabling a cylinder of the engine, measuring a second parameter indicative of performance of the engine when the cylinder is disabled, re-enabling the cylinder, comparing the first parameter and the second parameter, and assessing a status of the cylinder based on the comparison.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus.

In this disclosure, relative terms, such as, for example, "about," substantially," and "approximately" are used to indicate a possible variation of ±10% in a stated value. The term "exemplary" is used in the sense of "example" rather than "ideal." As used herein, the singular forms "a," "an," and "the" include plural reference unless the context dictates otherwise.

Figure 1:
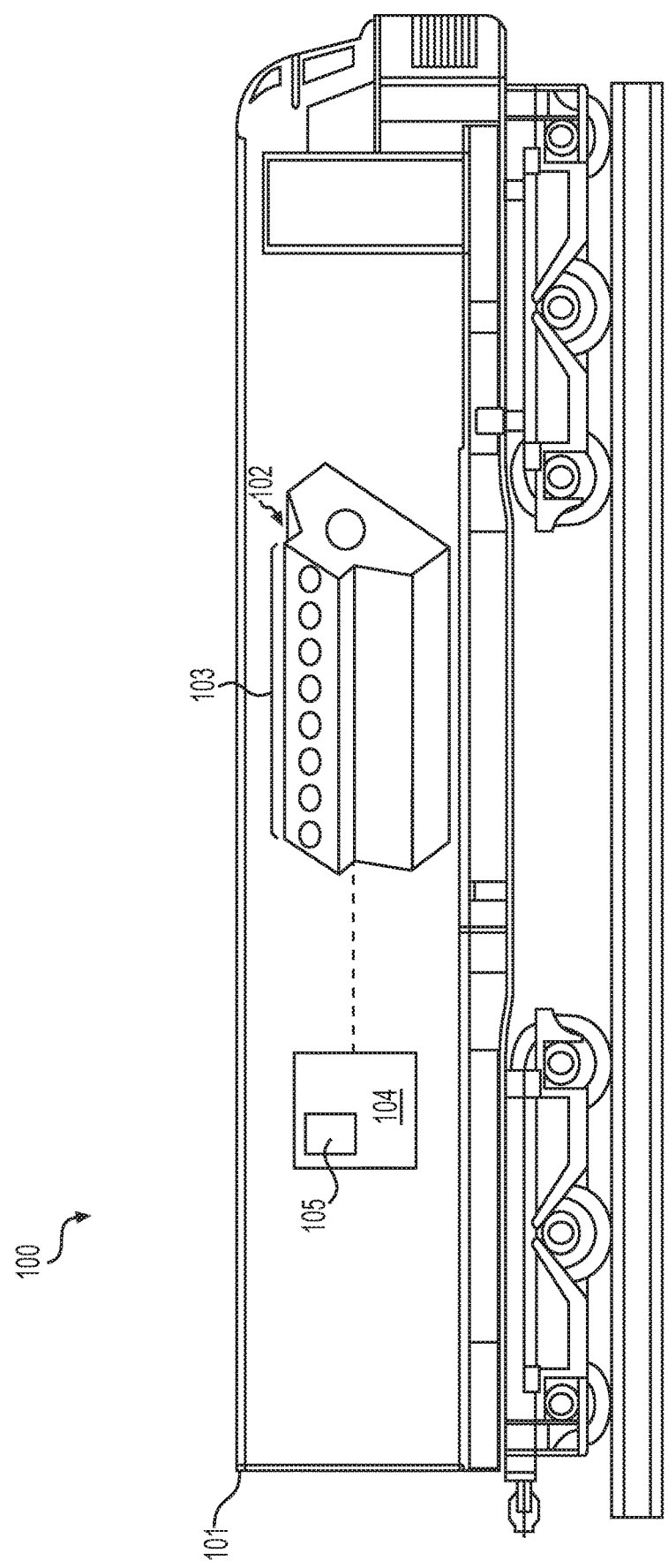
FIG. 1 is a schematic representation of an exemplary system for diagnosing an engine of a vehicle.

FIG. 1 illustrates an exemplary system 100 for diagnosing an internal combustion engine 102 of a vehicle 101. As will be explained in detail below, the system 100 may detect defective cylinders 103 in the engine 102. As used herein, a defective engine cylinder may include, for example, any lack of performance of the engine cylinders 103, and may attributable to any component associated with the engine cylinders 103 (e.g., the associated fuel injector, power assembly, etc.). The diagnosis may be performed during the normal or intended operation of the vehicle 101, e.g., when the vehicle 101 is mobile traveling on roads, ground surface, rail tracks, etc. The system 100 may include one or more of: the engine 102 that includes engine cylinders 103, a controller 104, and a data storage device 105. In general, the controller 104 may initiate a diagnostic test to assess the status of one or more of the engine cylinders 103. The diagnostic test may be performed by measuring the power contribution of the tested engine cylinder. The controller 104 may then detect whether any of the tested engine cylinders is defective based on the measurements. The status of the engine cylinders 103 may be archived in the data storage device 105 to further assist in maintenance or trend analysis of the engine 103.

The vehicle 101 may be any type of vehicle. For example, the vehicle 101 may be an industrial vehicle, such as a locomotive, and excavator, a dozer, a loader, a tractor, a paver, a cold planer, a reclaimer, a compactor, or an industrial truck; or may be a non-industrial vehicle such as an automobile. As shown in FIG. 1, the exemplary vehicle 101 described below will be a locomotive. The vehicle 101 may include any appropriate and conventional control system including operator interfaces, and electronic components. For example, vehicle 101 may include appropriate electronic processors/controllers, sensors, memory, communications systems, and/or user interfaces.

The engine 102 may comprise any type of internal combustion engine, including, but not limited to, a diesel engine, a gasoline engine, or a gaseous fuel-powered engine. The engine 102 may comprise a plurality of engine cylinders, for example, 4, 6, 8, 10, 12, 14, or 16 engine cylinders. In one example, the engine may comprise 8 engine cylinders (as shown in FIG. 1).

The controller 104 may include any appropriate hardware and software, e.g., one or more processors, memory, communication systems, and/or other appropriate hardware. The processors may be, for example, a single- or multi-core processor, a digital signal processor, microcontroller, a general purpose central processing unit (CPU), and/or other conventional processor or processing/controlling circuit or controller. The memory may include, for example, read-only memory (ROM), random access memory (RAM), flash or other removable memory, or any other appropriate and conventional memory. The communication systems used in the components of the system 100 may include, for example, any conventional wired and/or wireless communication systems such as Ethernet, BLUETOOTH, and/or wireless local area network (WLAN) type systems. Further, the communication systems may include any appropriate and conventional user interface, such as keyboards, keypads, touchscreen interfaces, one or more displays, computer mice, and/or any other suitable user interface.

Figure 2:
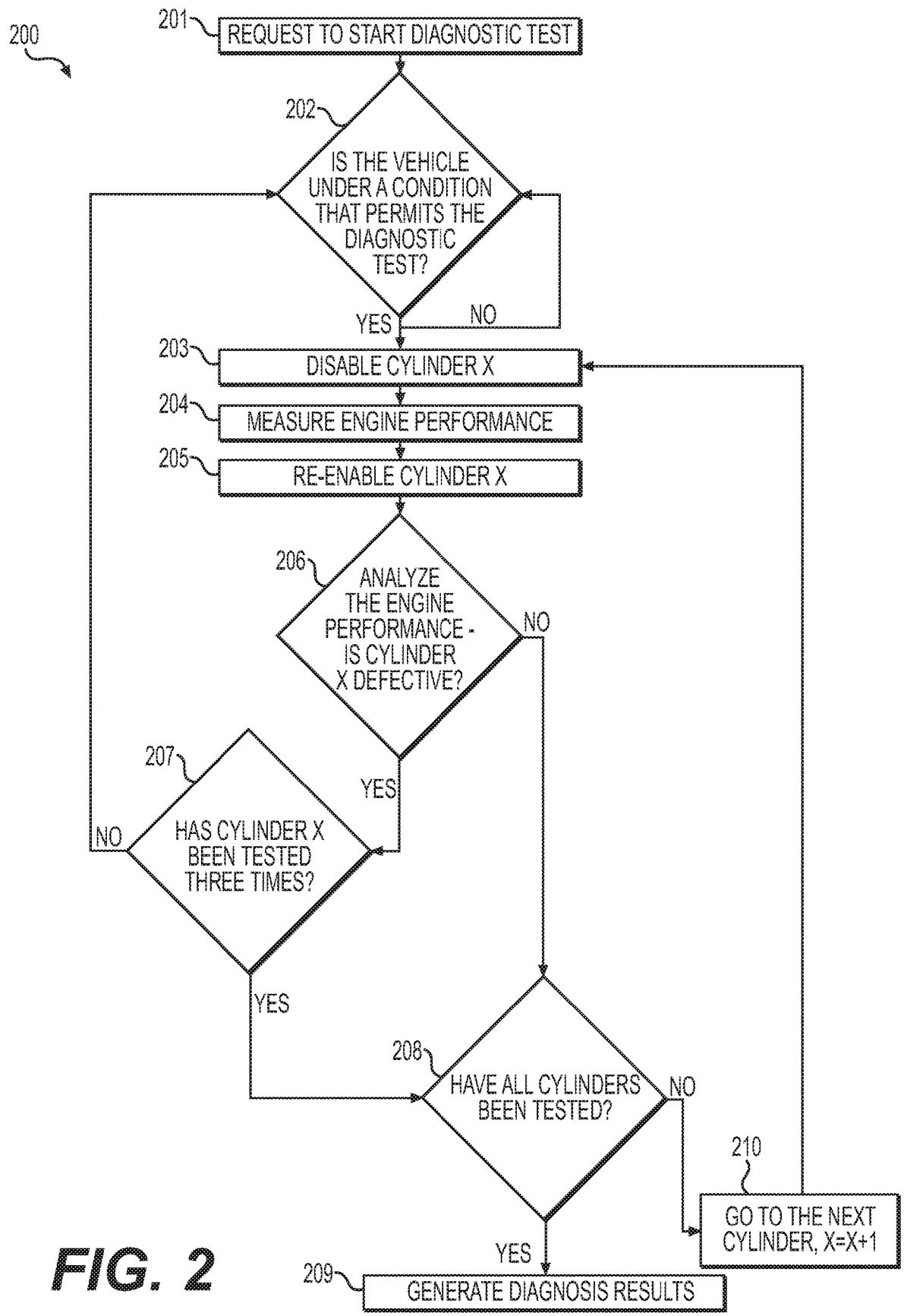
FIG. 2 is a flow chart that illustrates an exemplary method for diagnosing an engine of a vehicle.

The software associated with the components of the system 100 may include any appropriate software, programs, and/or applications for providing the functions provided in this disclosure (e.g., the functions of FIG. 2). Such software may be stored on the controller 104, or may be stored at another location on the vehicle 101, or could be stored remote from the vehicle 101 and accessible from the vehicle 101. The components of the system 100 may further include one or more data storage devices storing instructions for performing the methods herein, a non-transitory computer readable medium for use on a computer system containing computer-executable programming instructions for performing the methods herein, and/or a processor configured to execute the instructions.

The controller 104 may be configured to disable or enable one or more components in the engine 102. For example, the controller 104 may be configured to disable a selected cylinder of the engine 102. The controller 104 may be configured to receive, measure, and/or analyze parameters indicative of the performance of the engine 102 and/or the performance of the components (e.g., an engine cylinder) in the engine 102. In some cases, the controller 104 may be configured to analyze the parameters to determine whether a component in the engine 102 is defective.

The system 100 may further comprise a data storage device 105 for storing measurements made during the diagnostic test and diagnostic results. The data storage device 105 may be on the vehicle 101. Alternatively or additionally, the data storage device 105 may be at a remote location. In some cases, the data storage device 105 may be a cloud-based storage device. As used herein, the term "cloud" refers to storing and accessing data and programs over the Internet. In some cases, the data storage device 105 may be a part of the controller 104.

FIG. 2 is a flow chart that illustrates an exemplary method 200 for diagnosing the engine 102. The method may be performed by the system 100 illustrated in FIG. 1. Step 201 may include generating a request to start a diagnostic test on the engine 102. The request may be generated by the controller 104. The request may be generated by a time-based schedule. For example, the request may be scheduled once a week or once a month. Alternatively or additionally, the request may be generated according to a mileage-based schedule. For example, the request may be generated when the vehicle reaches at least 10,000 miles, at least 20,000 miles, at least 50,000 miles, and/or at least 100,000 miles. In some cases, the request may be generated on demand by a user, such as a driver of the vehicle 101 or a technician servicing the vehicle 101. In certain cases, another diagnostic or prognostic program may identify the engine as "suspect," and may generate a request to run the test described herein for further evaluation.

After a request for a diagnostic test is generated, Step 202 may include determining whether the conditions of vehicle 101 are appropriate to run the diagnostic test, (e.g., whether the conditions of the engine 102 are acceptable to run a diagnostic test). For example, such conditions may help ensure that the diagnostic test provides accurate results, and does not negatively affect the operation or safety of the vehicle 101. Such required conditions may involve, for example, the powering operation mode of the vehicle 102, the throttle setting, whether the engine power is in control of traction load, whether the vehicle 101 is at a safe location for the test, whether the vehicle 101 is in power circuit transition, whether there is any engine system faults, whether there is any wheel slip activity, the engine water temperature, the ambient temperature, and/or the level of fuel required to achieve a desired power (e.g., rated power), or any combinations thereof.

If the vehicle 101 is not in a condition that permits running of the diagnostic test, Step 202 may be repeated. Step 202 may be repeated after a period of time, e.g., after five minutes, after an hour, or after a day. Step 202 may be repeated until the vehicle 101 is under a condition that permits a diagnostic test. Alternatively or additionally, the system 100 may include a monitor for real-time determining whether the vehicle 101 is under a condition that permits a diagnostic test. In some examples, Step 202 may be repeated only when a new request to start the diagnostic test is generated.

If it is determined that the vehicle 101 is under a condition that permits a diagnostic test, the diagnostic test is initiated, and at least one of the cylinders 103 in the engine 102 is disabled (Step 203). The engine cylinder may be disabled, for example, by cutting the fuel supply to the engine cylinders 103. In some examples, only one cylinder of the engine 102 is disabled at a time. However, in certain examples, a plurality of cylinders 103 in the engine 102 may be disabled at the same time to help diagnose subsets of engine cylinders 103.

Step 204 may include measuring the performance of the engine 102 when an engine cylinder is disabled. Step 204 may include measuring one or more parameters indicative of the performance of the engine 102 while the engine cylinder is disabled. Such parameters may include one or more of engine speed (e.g., engine rotation speed in revolutions per minute (RPM)), engine horsepower, engine efficiency, and fueling rate. The measured parameters may be stored in the data storage device 105 and analyzed by the controller 104. After the measurement is completed, the disabled engine cylinder may be re-enabled (Step 205). The disabling and/or the re-enabling may be performed by the controller 104.

Step 206 may include determining whether the performance of the engine 102 is affected by disabling one or more of the engine cylinders 103. The status of disabled engine cylinder 103 may be assessed based on the effect of disabling the engine cylinder on the engine performance. For example, Step 206 may include comparing the measured parameters in Step 204 (e.g., engine speed, engine horsepower, etc.) after disabling the engine cylinder 103 with reference data. The reference data may be a parameter indicative of the performance of the engine 102 prior to the engine cylinder 103 being disabled. For example, the reference data may be a parameter engine speed before the engine cylinder 103 is disabled in Step 203, with that value being compared to, engine speed after disabling the engine cylinder 103. The comparison of engine performance can be used to determine whether the cylinder is defective. The status of the engine cylinder may be archived, e.g., in the data storage device 105.

If Step 206 determines that the performance of the engine 102 is not affected by the engine cylinder disablement, the disabled engine cylinder may be assessed as defective. A disabled engine cylinder 103 that has no effect on an engine parameter (e.g., engine speed) indicates that the engine 102 was already compensating for the defective cylinder 103. In these cases, the diagnostic test on the engine cylinder (e.g., Steps 202-206) may be repeated (e.g., one or more times) to confirm the assessment (Step 207). A diagnostic result may be generated based on the status assessed in all of the diagnostic tests on the engine cylinder. For example, when the assessed status of the engine cylinder from at least 50% of the diagnostic tests on the engine cylinder suggest that the engine cylinder disablement does not affect the performance of the engine 102, the engine cylinder may be assessed as defective.

If Step 206 determines that the performance of the engine 102 is affected by the engine cylinder disablement, the disabled engine cylinder may be assessed as healthy. Then the diagnostic test may be repeated to test another cylinder of the engine 102 (Step 210).

In some cases, when Step 206 determines that the performance of the engine 102 is affected by the engine cylinder disablement, further analysis may be performed to determine whether the engine cylinder is partially functional. The analysis may be performed by comparing the measured engine performance to reference data. The reference data may be the engine performance when a healthy engine cylinder is disabled. If the measured engine performance is substantially the same as the reference data, the engine cylinder may be assesses as healthy. Alternatively, when the measured engine performance is different from the reference data, the engine cylinder may be assessed as partially functional. The degree of dysfunctionality of the engine cylinder may be assessed based on the comparison.

Figure 3:
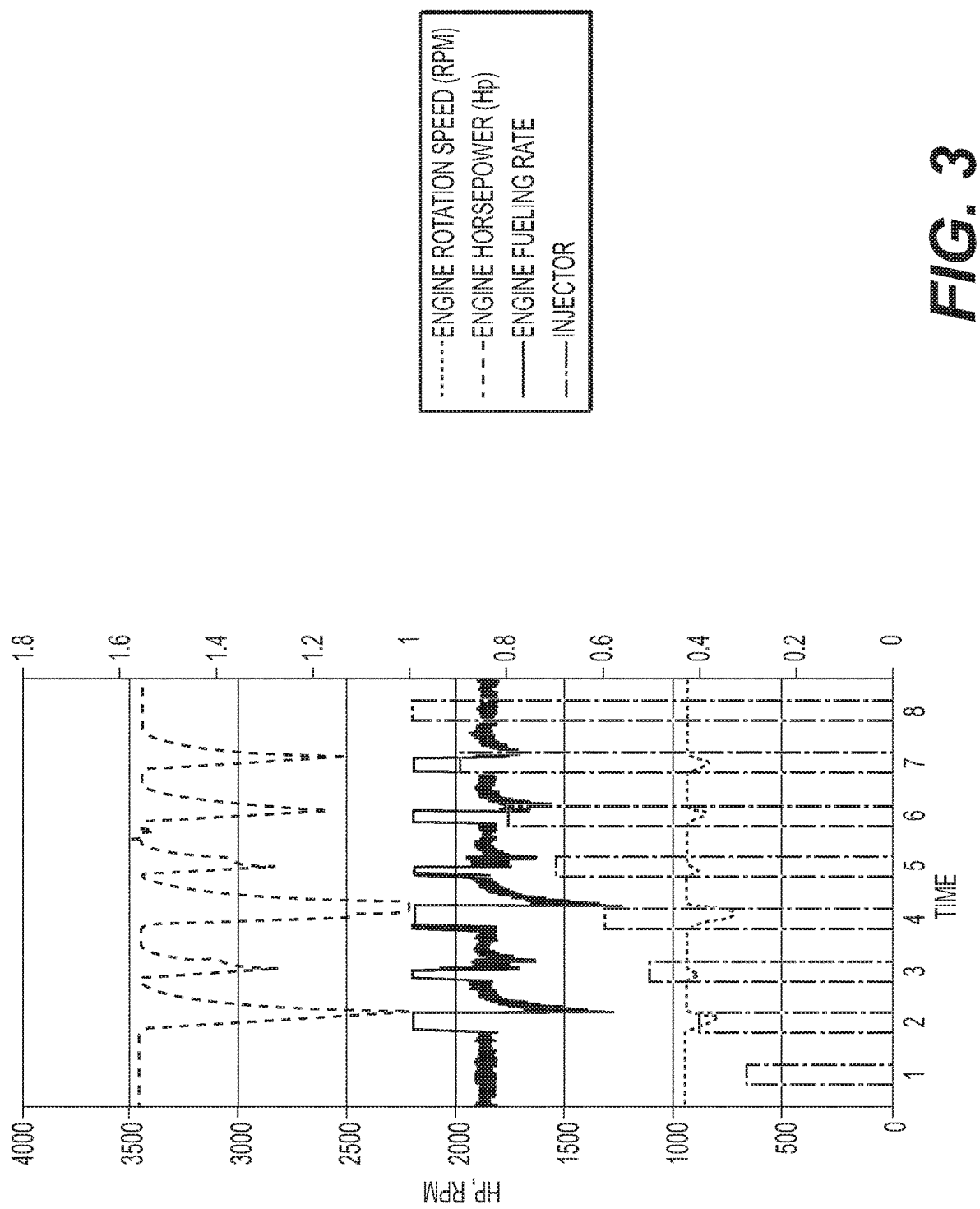
FIG. 3 shows the result from an exemplary diagnostic test.

FIG. 3 shows an exemplary test for diagnosing eight cylinders in the engine 102. Cylinders #1 to #8 are disabled sequentially one at a time. Parameters indicative of the performance of the engine 102, including engine speed, horsepower, and fueling rate, are measured. As shown in FIG. 3, disabling of cylinders #1 and #8 have no effect on the engine's performance, while disabling of the cylinders #2-#7 affects the engine's performance. The results indicate that cylinders #1 and #8 are defective. The effects of disabling of cylinders #2-#7 on the measured parameters may be further analyzed to determine the status of these cylinders.

Alternatively or additionally, Step 206 may include measuring the change of power contribution of other engine cylinders that are not disabled in response to the disablement of the engine cylinder. For example, Step 206 may include maintaining the performance of the engine 102 at certain level, e.g., at least 70%, at least 80%, at least 90%, or 100%, and measuring the performance of one or more of the engine cylinders that are not disabled. The performance of the engine cylinders that are not disabled may be compared to reference data. The comparison may be used to determine whether the disablement of an engine cylinder has any impact on the performance of other engine cylinders. The difference between the reference data and the measured performance of the other engine cylinders may indicate the status of the disabled engine cylinder. In some cases, the reference data may be the performance of the other engine cylinders when all engine cylinders are enabled. If no difference is determined from the comparison, then the disabled engine cylinder may be assessed as defective. If the measured performance is greater than the reference data, then the disabled engine cylinder may be assessed as healthy or partially functional. Further analysis may be performed to determine whether the disabled engine cylinder is healthy. Alternatively or additionally, the reference data may be the power contribution of the other engine cylinders for maintaining the power of the engine 102 at a certain level when a healthy engine cylinder is disabled. If there is no difference between the measured performance of the other engine cylinders and the reference data, the disabled engine cylinder may be assessed as healthy.

The reference data described herein may be measurements made during the diagnostic test. Alternatively or additionally, the data may be pre-defined values stored in the data storage device 105.

Step 208 may include determining whether all engine cylinders have been tested. If not, then Steps 202-207 may be repeated until all cylinders in the engine 102 are tested. If all engine cylinders have been tested, then the measurements from the diagnostic test may be analyzed and a diagnostic result may be generated (Step 209). The diagnostic result may include the assessed status of the cylinders in the engine 102 and/or the level of dysfunctionality of the engine cylinders assessed as defective. The diagnostic result may further include instructions for servicing the engine. For example, the diagnostic result may suggest a schedule for servicing the vehicle. The diagnostic test described herein may be repeated multiple times. Any change in the status of the tested engine cylinders may be analyzed. The analysis may reveal a decrease in the performance of an engine cylinder over time (i.e., over the time span of numerous diagnostic tests). In these cases, the diagnostic result may include a suggested service schedule based on the change of status of the engine cylinder.

INDUSTRIAL APPLICABILITY

The present disclosure finds potential application in diagnosing an engine of a vehicle. The present disclosure enables identifying the defective engine cylinders in an engine of a vehicle during normal or intended operation of the vehicle 101, e.g., when the vehicle 101 is mobile traveling on roads, ground surface, rail tracks, etc. Alternatively or additionally, the diagnosis described herein may be performed when the vehicle 101 is in a service shop setting.

For example, the present disclosure includes a method for identifying a defective cylinder of the engine 102. In such an example, when the vehicle 101 is traveling on tracks or a road under conditions that permit a diagnostic test, a cylinder of the engine 102 of the vehicle 101 is disabled and the performance of the engine 101 is measured. The diagnostic test may be performed in the background while the vehicle 101 during normal or intended operation of the vehicle 101. The measured performance is used to determine whether disabling the engine cylinder has an effect on engine operation. If the engine cylinder disablement has no or negligible effect on the performance of the engine 102, then the disabled engine cylinder is assessed as defective. If the engine cylinder disablement has significant effect on the performance of the engine 102, the disabled engine cylinder is considered healthy. In some cases, the effect of the engine cylinder disablement may be further analyzed to determine if the tested engine cylinder is partially functional. When found defective, the engine cylinder may be retested one or more times to confirm the result. The diagnostic test can be performed on each cylinder of the engine individually to identify all defective engine cylinders.

It will be apparent to those skilled in the art that various modifications and variations can be made to the disclosed system without departing from the scope of the disclosure. Other embodiments of the system will be apparent to those skilled in the art from consideration of the specification and practice of the method disclosed herein. It is intended that the specification and examples be considered as exemplary only, with a true scope of the disclosure being indicated by the following claims and their equivalents.

What is claimed is:

1. A method for diagnosing an engine in a vehicle, the method comprising:
   a. initiating a diagnostic test of the engine;
   b. disabling a cylinder of the engine;
   c. measuring a parameter indicative of performance of the engine, including engine rotation speed, engine horsepower, or a combination thereof;
   d. re-enabling the cylinder;
   e. comparing the parameter to reference data;
   f. assessing a first status of the cylinder based on the comparison, including determining whether the cylinder is defective;
   g. when the first status indicates that the cylinder is defective, repeating (b)-(f), thereby assessing a second status of the cylinder; and
   h. generating a diagnostic result of the cylinder, wherein the diagnostic result is generated based on the first status and the second status.

2. The method of claim 1, wherein the vehicle is a locomotive.

3. The method of claim 2, wherein the diagnostic test is initiated by a user.

4. The method of claim 1, further comprising, prior to disabling a cylinder of the engine, determining whether conditions of the engine are acceptable to run the diagnostic test.

5. The method of claim 1, wherein the diagnostic test is initiated on a time-based schedule or a mileage-based schedule.

6. The method of claim 1, wherein the cylinder is disabled during normal operation of the vehicle.

7. The method of claim 1, further comprising archiving the first status of the cylinder in a data storage device.

8. The method of claim 1, wherein the diagnostic result comprises instructions for servicing the vehicle.

9. The method of claim 1, wherein the cylinder is a first cylinder, the parameter is a first parameter, and the diagnostic result is a first diagnostic result, the method further comprising:
   after (f), disabling a second cylinder;
   measuring a second parameter indicative of performance of the engine;
   comparing the second parameter to the reference data;
   assessing a status of the second cylinder based on the comparison; and
   generating a second diagnostic result based on the status of the second cylinder.

10. The method of claim 9, further comprising repeating (b)-(f) until status of all cylinders of the engine have been assessed.

11. The method of claim 1, further comprising repeating (a)-(f), thereby assessing a plurality of status of the cylinder at multiple time points.

12. The method of claim 1, wherein the reference data is a parameter indicative of performance of the engine when the cylinder is enabled.

13. The method of claim 1, wherein measuring the parameter indicative of performance of the engine includes measuring performance of one or more cylinders in the engine different from the disabled cylinder.

14. A method for diagnosing an engine in a vehicle, the method comprising:
   a. determining whether conditions of the engine are acceptable to run a diagnostic test;
   b. when the conditions of the engine are acceptable to run the diagnostic test, disabling a first cylinder of the engine;
   c. maintaining at least 90% of performance of the engine;
   d. measuring performance of a second cylinder of the engine, wherein the second cylinder is not disabled;
   e. comparing the performance of the second cylinder to reference data;
   f. assessing a status of the first cylinder based on the comparison;
   g. repeating the maintaining, the measuring, and the comparing;
   h. repeating the assessing the status of the first cylinder to confirm the status of the first cylinder; and
   i. generating a diagnostic result based on the status of the first cylinder.

15. The method of claim 14, wherein the reference data is a parameter indicative of performance of the second cylinder when the first cylinder is enabled.

16. The method of claim 14, wherein the reference data is a parameter indicative of performance of the second cylinder when a healthy cylinder is disabled and the engine maintains at least 90% of performance.

17. A method for diagnosing an engine in a vehicle, the method comprising:
   a. measuring a first parameter indicative of performance of the engine, including engine rotation speed, engine horsepower, or a combination thereof;
   b. disabling a cylinder of the engine;
   c. measuring a second parameter indicative of performance of the engine when the cylinder is disabled, including engine rotation speed, engine horsepower, or a combination thereof;
   d. re-enabling the cylinder;
   e. comparing the first parameter and the second parameter;
   f. assessing a status of the cylinder based on the comparison;
   g. repeating the disabling, measuring, re-enabling, and comparing; and
   h. repeating the assessing to confirm the status of the cylinder.

* * * * *